(12) United States Patent
Riopel (10) Patent No.: US 11,137,239 B2
(45) Date of Patent: Oct. 5, 2021

(54) MAGNETIC PIPE SQUARE LEVEL

(71) Applicant: Leon Richard Riopel, Sylvan Lake (CA)

(72) Inventor: Leon Richard Riopel, Sylvan Lake (CA)

( * ) Notice: Subject to any disclaimer, the term of this patent is extended or adjusted under 35 U.S.C. 154(b) by 108 days.

(21) Appl. No.: 16/720,524

(22) Filed: Dec. 19, 2019

(65) Prior Publication Data

US 2021/0190467 A1 Jun. 24, 2021

(51) Int. Cl.
| | |
|---|---|
| *G01B 3/56* | (2006.01) |
| *G01C 9/28* | (2006.01) |
| *G01B 3/04* | (2006.01) |
| *G01C 9/34* | (2006.01) |
| *G01B 5/245* | (2006.01) |

(52) U.S. Cl.
CPC ............... *G01B 3/566* (2013.01); *G01B 3/04* (2013.01); *G01B 5/245* (2013.01); *G01C 9/28* (2013.01); *G01C 9/34* (2013.01)

(58) Field of Classification Search
None
See application file for complete search history.

(56) References Cited

U.S. PATENT DOCUMENTS

| | | | | |
|---|---|---|---|---|
| 2,461,783 | A * | 2/1949 | Stark | B23K 37/0536 |
| | | | | 33/529 |
| 3,499,225 | A | 3/1970 | Darrah | |
| 3,832,782 | A * | 9/1974 | Johnson | G01C 9/28 |
| | | | | 33/451 |
| 4,338,725 | A * | 7/1982 | Martin | G01B 5/24 |
| | | | | 33/418 |
| 4,375,724 | A * | 3/1983 | Brock | G01B 5/24 |
| | | | | 33/529 |
| 4,420,891 | A * | 12/1983 | Orem | G01B 3/566 |
| | | | | 33/476 |
| 4,593,475 | A | 6/1986 | Mayes | |
| 4,999,922 | A * | 3/1991 | Loggins | B43L 7/027 |
| | | | | 33/474 |
| 5,231,766 | A * | 8/1993 | Pavlak | G01B 3/56 |
| | | | | 33/529 |
| 5,421,094 | A * | 6/1995 | McCord | G01C 9/28 |
| | | | | 33/371 |
| 5,933,974 | A | 8/1999 | Walters et al. | |
| 6,029,360 | A * | 2/2000 | Koch | G01C 9/28 |
| | | | | 33/381 |

(Continued)

FOREIGN PATENT DOCUMENTS

WO 2017053231 A1 3/2017

*Primary Examiner* — Christopher W Fulton
(74) *Attorney, Agent, or Firm* — Stratford Group Ltd.

(57) ABSTRACT

A magnetic pipe square level comprising one or more magnetic members fused to an angle iron, a square that consists of a base member and a perpendicular member, the angle iron fused to the base member, one or more bubble levels attached to the square oriented in line with one or both of the base member and the perpendicular member, an anchor point attached to the perpendicular member, a track for a string line underneath the tip of the angle iron, a notch at the end of the track where the base member and the perpendicular member intersect and one or more sets of tick marks along an edge of the perpendicular member providing a reference point for a measurement.

7 Claims, 7 Drawing Sheets

(56) References Cited

U.S. PATENT DOCUMENTS

| | | | | |
|---|---|---|---|---|
| 6,230,416 | B1* | 5/2001 | Trigilio | B43L 7/027 33/451 |
| 6,622,395 | B1* | 9/2003 | Hickey | B25H 7/005 33/452 |
| 6,918,187 | B2* | 7/2005 | Schaefer | G01C 9/26 33/365 |
| 6,996,911 | B1 | 2/2006 | Dinius | |
| 7,117,606 | B2* | 10/2006 | Brown | G01C 9/28 33/365 |
| 7,975,395 | B2 | 7/2011 | Keller et al. | |
| 8,336,221 | B2* | 12/2012 | Steele | H02G 1/00 33/528 |
| 10,124,482 | B2 | 11/2018 | Ramirez | |
| 2002/0092191 | A1* | 7/2002 | Hauzie, Jr. | G01B 5/25 33/529 |
| 2003/0005590 | A1* | 1/2003 | Snyder | G01C 9/28 33/370 |
| 2003/0066198 | A1* | 4/2003 | Turner | G01C 9/28 33/370 |
| 2009/0090012 | A1* | 4/2009 | Varnedoe | B23K 37/0443 33/475 |
| 2010/0115781 | A1* | 5/2010 | Norelli | G01C 9/28 33/371 |

\* cited by examiner

MAGNETIC PIPE SQUARE LEVEL

FIELD OF THE INVENTION

The present disclosure relates to a magnet pipe square level, more specifically but not by way of limitation, a magnet pipe square level that is composed of magnetic members fused to an angle iron and square that may be employed to ensure accuracy in pipe fitting and side squaring.

BACKGROUND

Current methods for leveling and alignment for pipe fitting generally require two or more persons as well as an extensive amount of time for ensuring accuracy of the level and alignment. The additional labor and time required add further costs to construction projects. Current methods include magnetic levels and squares that require a flat base and additional time for adjustment on curved surfaces. Furthermore, harsh weather and debris on pipe increase the difficulty of holding the steel which may negatively affect leveling and alignment in pipe fitting.

U.S. Pat. No. 6,996,911 B1 (Dinius) discloses a square with bubble levels attached to each member for pipe fitting and holding 90-degree angled pipes or joints in place, where the square is attached to the pipes through magnets, tapes or adhesive plastics. Shortcomings include an inability to preform accurate side squaring and angled fits beyond a 90-degree fit.

U.S. Pat. No. 10,124,482 B2 (Ramirez) discloses a pipe square with bubble level attached to each member and an additional angled member with accompanying levels for pipe fitting pipes along similarly oriented pipes complete with lights and a magnifying lens, where the pipe square is attached to the pipe and second member through magnets, tapes or adhesive plastics. Shortcomings include an inability to accurate preform side squaring and angled fits beyond a pipe-to-pipe fit.

CA. Pat. No. 2,390,726 C (Snyder) discloses a removable magnetic attachment to pipes with horizontal, vertical and angled bubble level indicators for cylindrical objects. Shortcomings include an inability to preform accurate side squaring and angled fits beyond a pipe-to-pipe fit.

All documents cited herein are incorporated by reference.

There is a need for a device that assists in leveling and alignment for piping fitting at a wide range of angles that is fast and simple to use, doesn't require additional assistance to employ and is accurate in its application.

BRIEF SUMMARY

It is the object of the present invention to provide a magnetic pipe square level.

In accordance with an aspect of the invention, there is provided a magnetic pipe square level comprising one or more magnetic members fused to an angle iron, a square that consists of a base member and a perpendicular member, the angle iron fused to the base member, one or more bubble levels attached to the square oriented in line with one or both of the base member and the perpendicular member, an anchor point attached to the perpendicular member, a track for a string line underneath the tip of the angle iron, a notch at the end of the track where the base member and the perpendicular member intersect and one or more sets of tick marks along an edge of the perpendicular member providing a reference point for a measurement.

In accordance with an embodiment of the invention, the square contains a bubble level on said base member.

In accordance with an embodiment of the invention, the square contains a bubble level on the perpendicular member.

In accordance with an embodiment of the invention, the square contains a bubble level on the base member and the perpendicular member.

In accordance with an embodiment of the invention, two magnetic members are fused to the ends of said angle iron.

In accordance with an embodiment of the invention, the measurement provides a length.

In accordance with another embodiment of the invention, the measurement provides an angle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Figure 1:
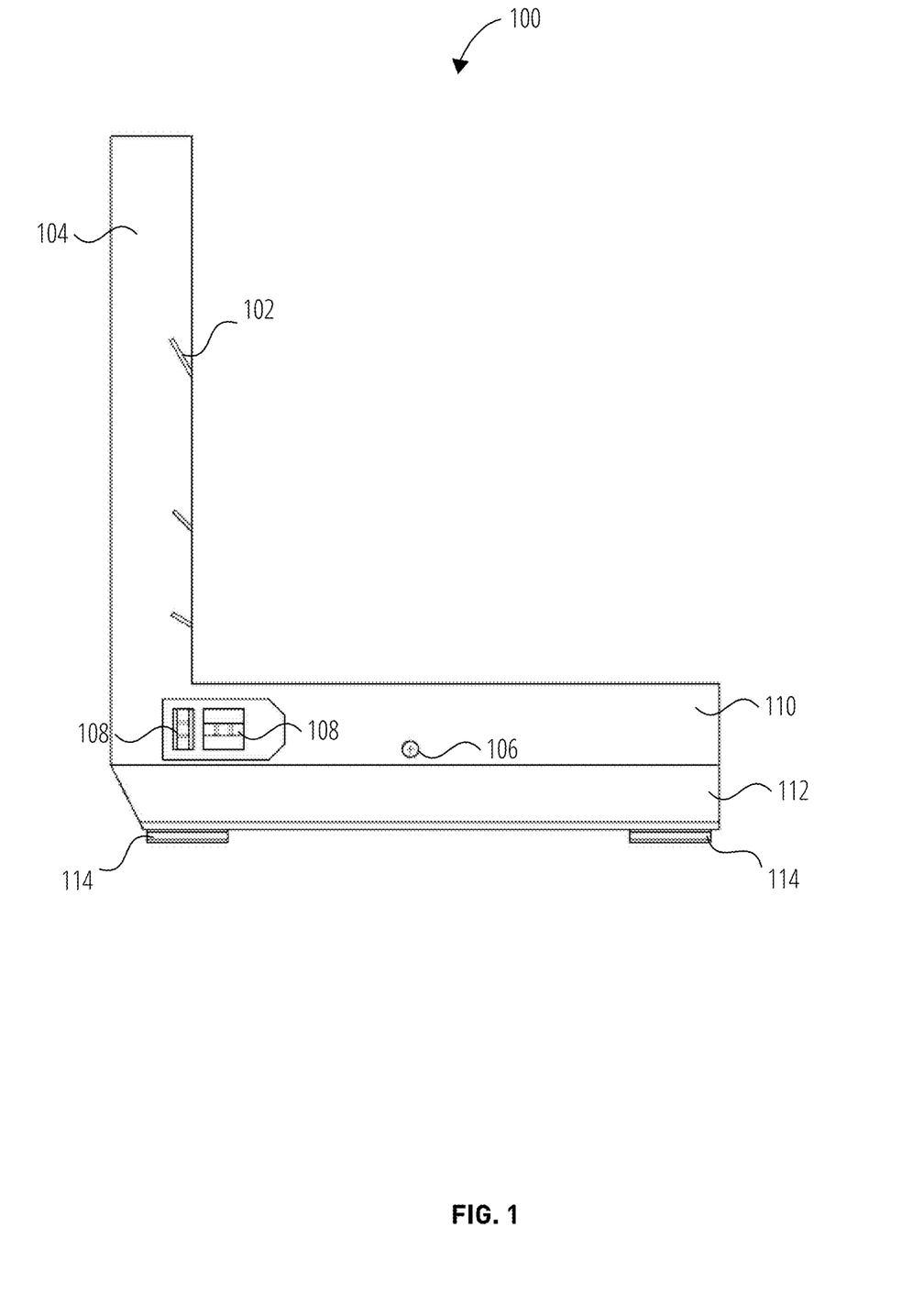
FIG. 1 illustrates a front profile 100 in accordance with one embodiment.

FIG. 1 depicts a front profile 100 of the magnetic pipe square level as in one embodiment. A square is shown consisting of a perpendicular member 104 that contains a plurality of tick marks, a base member 110 that contains an anchor point 106, a bubble level 108 oriented in line with the base member 110 and a bubble level 108 oriented in line with the perpendicular member 104. An angle iron 112 is shown comprising a magnetic member 114 at each end which are fused to the angle iron 112. The angle iron 112 is fused to the base member 110 of the square. The shape of the angle iron 112 along accompanied with the bubble level ensure accurate alignment with the true axis of the pipe during the pipe fitting process. The magnetic members enable quick and easy application of the magnetic pipe square level onto a desire pipe, as well as act to firmly secure the magnetic pipe square level onto a desire pipe. In another embodiment, an additional set of tick marks are present along the perpendicular member 104 enabling another form of measurement. In another embodiment, the set of tick marks enable a measurement for length.

Figure 2:
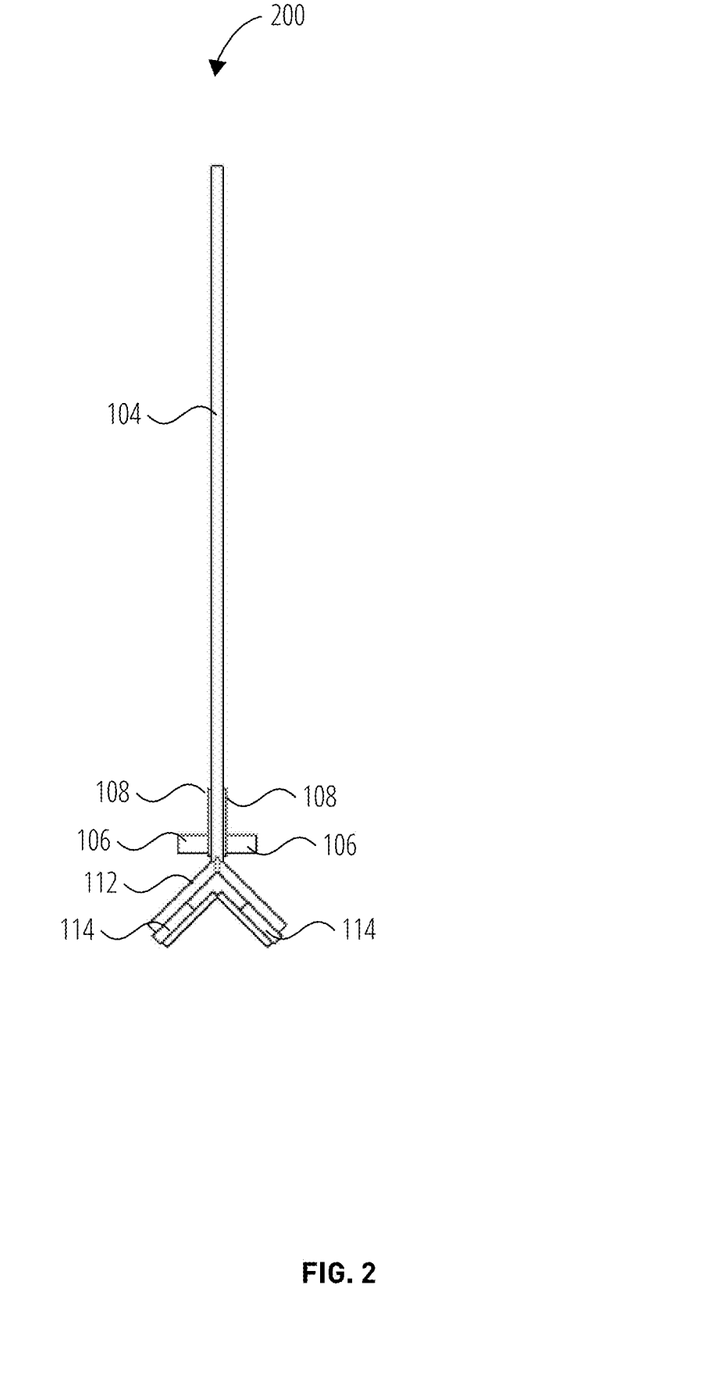
FIG. 2 illustrates a side profile 200 in accordance with one embodiment.

FIG. 2 depicts a side profile 200 of the magnetic pipe square level as in one embodiment. This view displays the symmetry between the two faces of the magnetic pipe square level. Each face consists of one or more sets of tick marks, one or more bubble levels and an anchor point.

Figure 3:
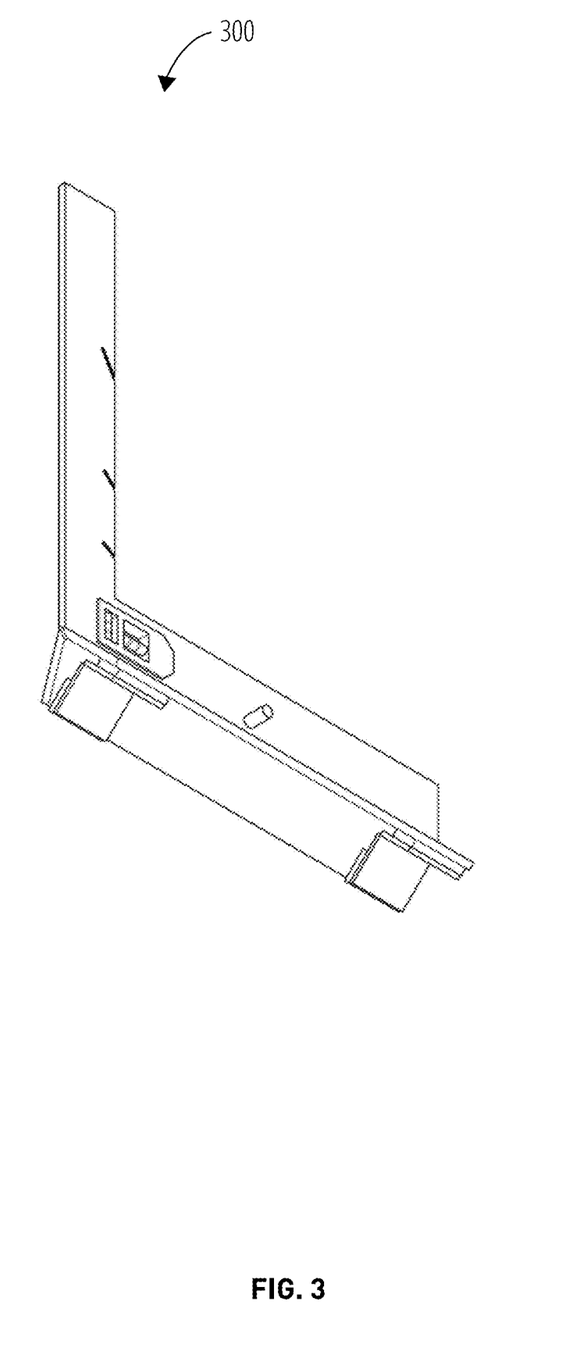
FIG. 3 illustrates an angled bottom profile 300 in accordance with one embodiment.

FIG. 3 depicts an angled bottom profile 300 of the magnetic pipe square level as in one embodiment.

Figure 4:
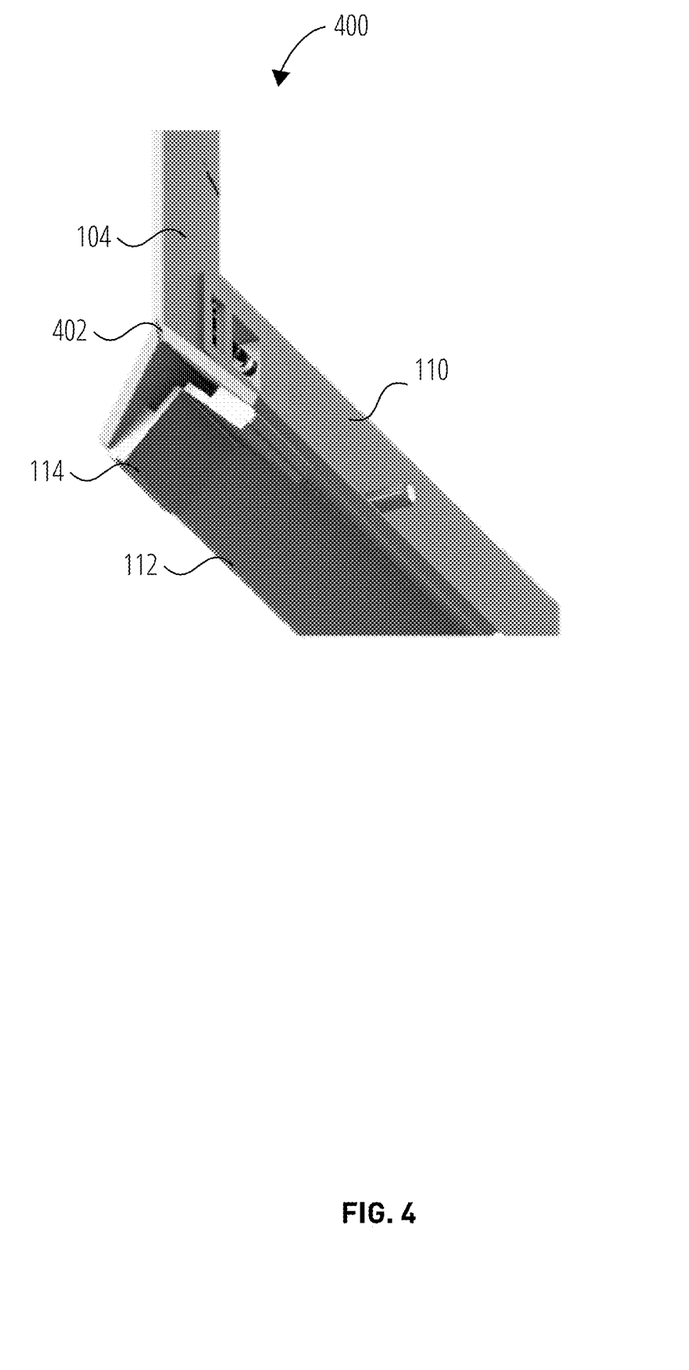
FIG. 4 illustrates a close up on the bottom 400 in accordance with one embodiment.

FIG. 4 depicts a close up of the bottom 400 of the magnetic pipe square level as in one embodiment. A notch 402 is shown at the intersection of the perpendicular member 104, base member 110 and angle iron 112. The angle iron 112 shape provides a track for string line to be run underneath the magnetic pipe square level. This track, the spacing between the magnetic member and the angle iron 112 and the notch 402 allow for a string line to be fed along the angle iron 112 and perpendicular member 104. This feature is employed during a 90-degree pipe fitting.

Figure 5:
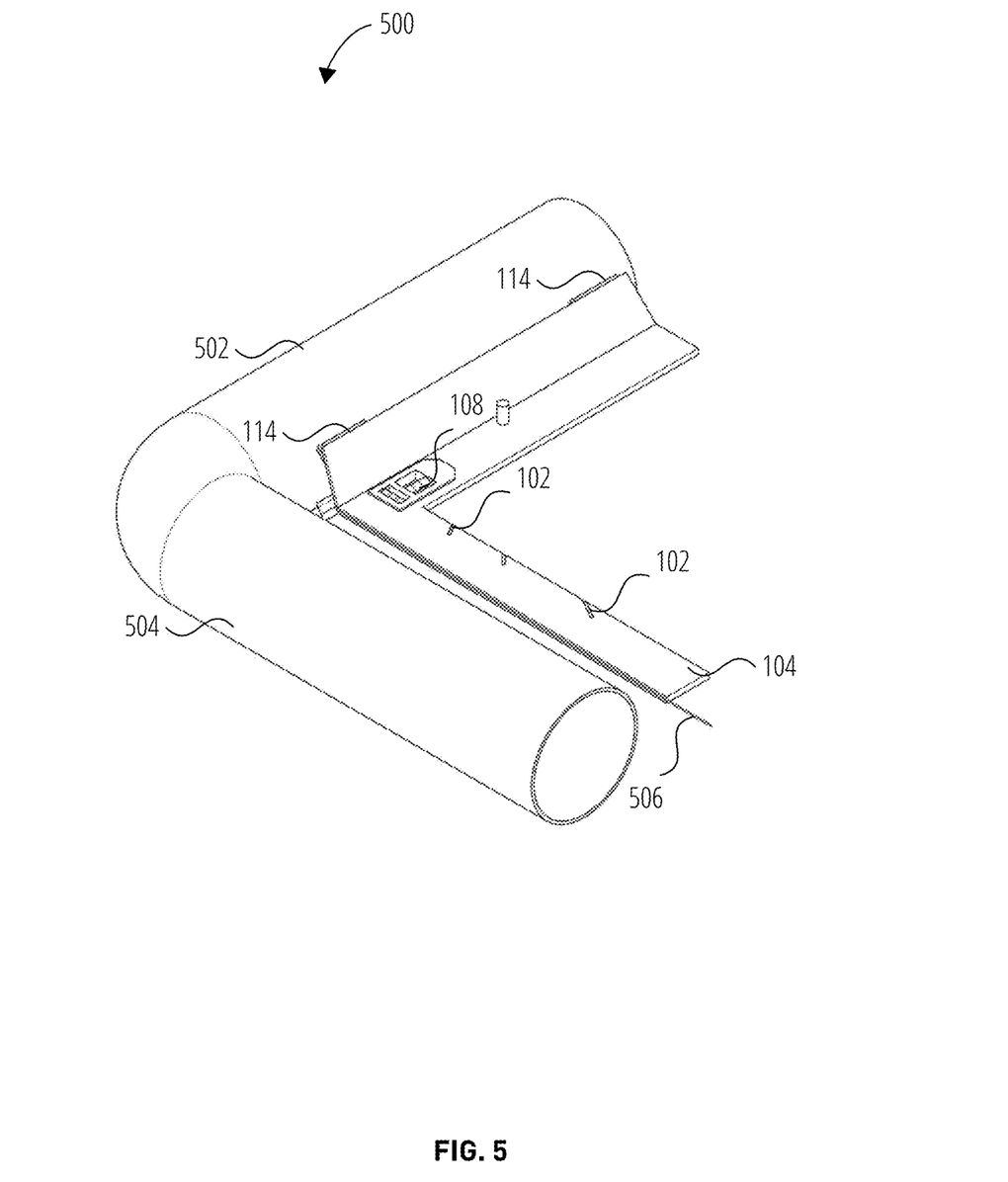
FIG. 5 illustrates a 90-degree side squaring 500 in accordance with one embodiment.

FIG. 5 depicts a 90-degree side squaring 500 of the magnetic pipe square level as in one embodiment. This example displays the application of the magnetic pipe square level for a 90-degree alignment between a primary pipe 502 and a secondary pipe 504. The magnetic pipe square level is secured to the primary pipe 502 by the magnetic members and verified to be level through inspection of the bubble level 108. A string line 506 is fed along the track located along the base of the magnetic pipe square level and the perpendicular member 104 as displayed and discussed in FIG. 4. By measuring and comparing the distances between the perpendicular member 104 and the secondary pipe 504 across the greatest possibly spaced tick marks, the accuracy of the 90-degree fit may be verified to a greater extent.

Figure 6:
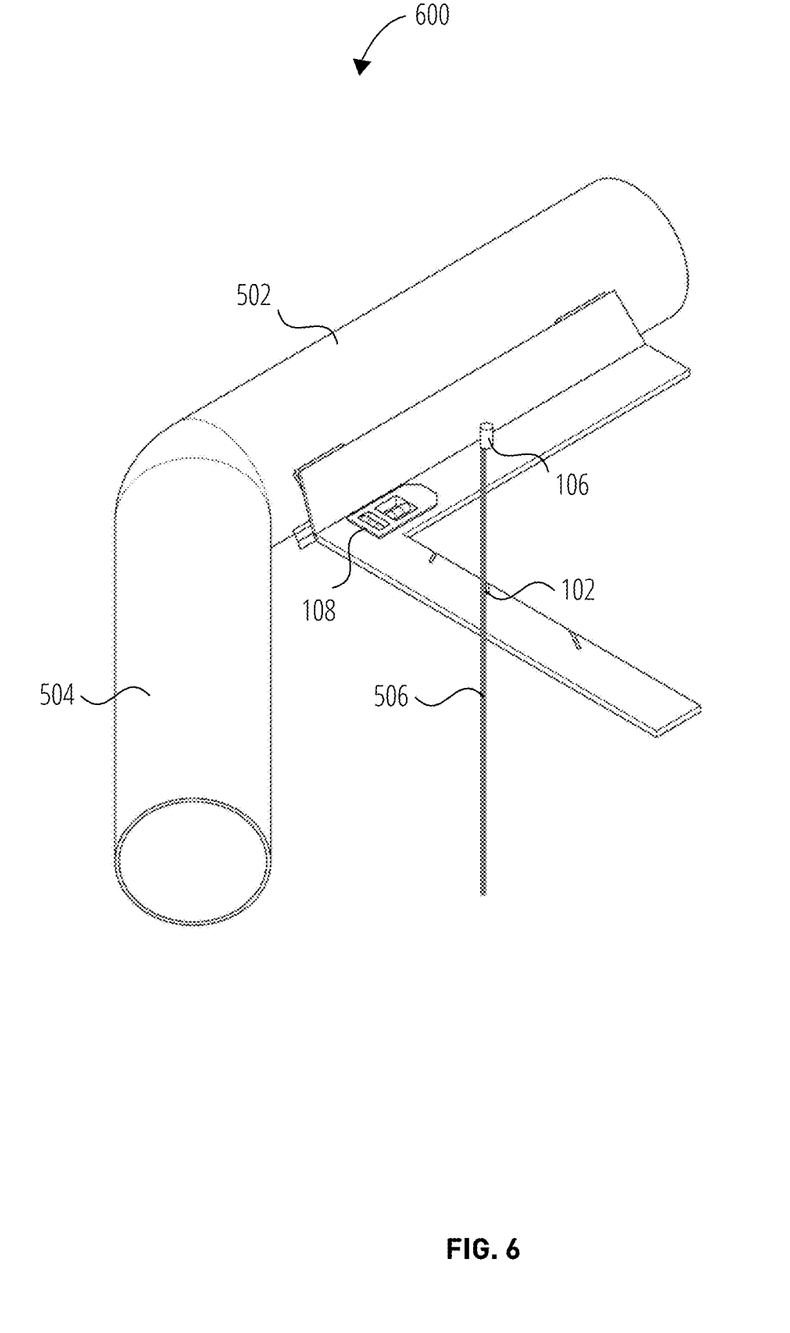
FIG. 6 illustrates a 45-degree side squaring 600 in accordance with one embodiment.

FIG. 6 depicts a 45-degree side squaring 600 of the magnetic pipe square level as in one embodiment. This example displays the application of the magnetic pipe square level for a 90-degree alignment between a primary pipe 502 and a secondary pipe 504. The magnetic pipe square level is secured to the primary pipe 502 by the magnetic members and verified to be level through inspection of the bubble level 108. A string line 506 is attached to the anchor point 106 and run in parallel to the tick mark 102 indicating the desired angle, which in this case is 45-degrees. By measuring and comparing the distances between the string line 506 and the secondary pipe 504 across the greatest possibly spaced distance along the secondary pipe 504, the accuracy of the 45-degree fit may be verified to a greater extent.

Figure 7:
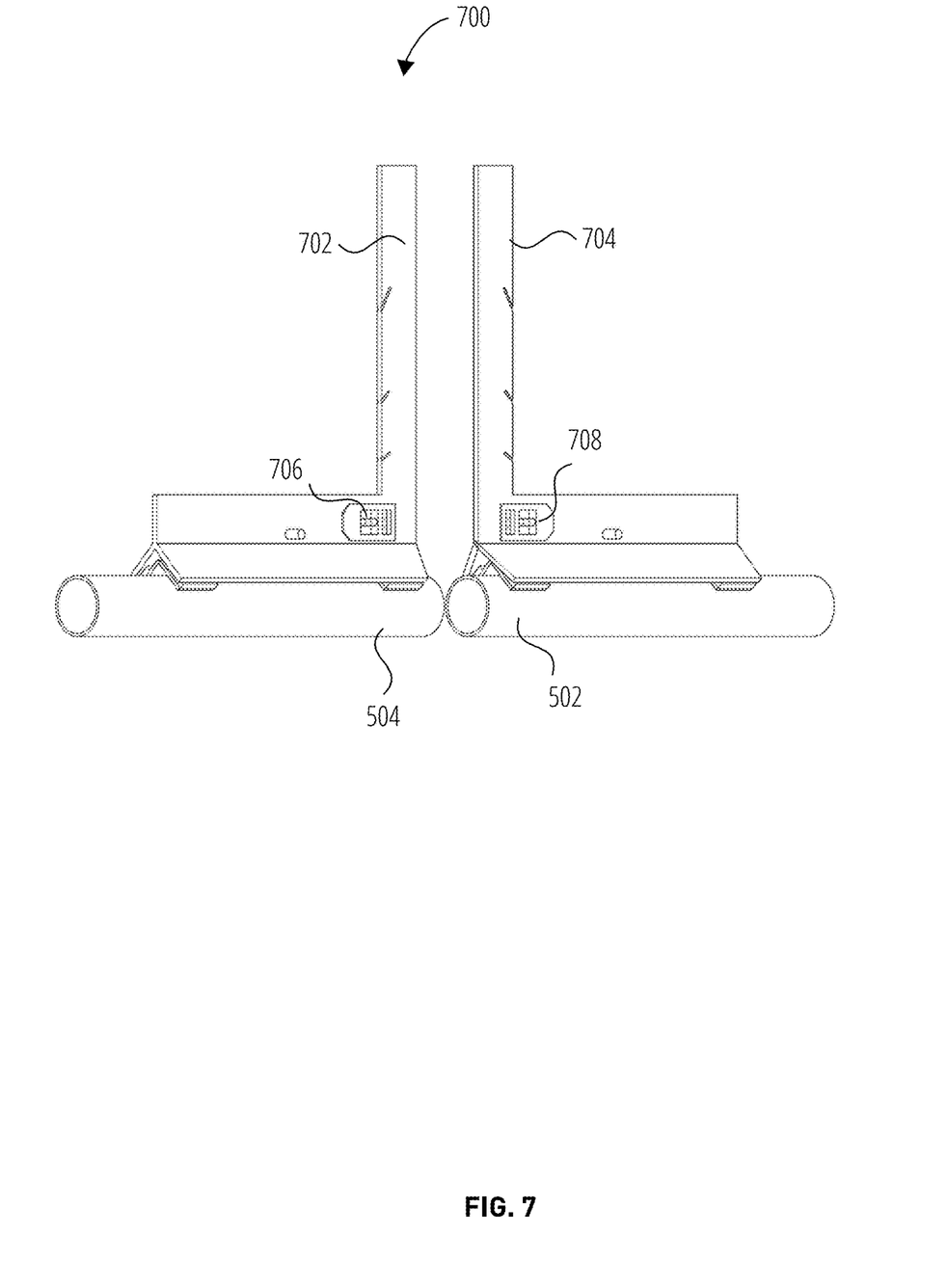
FIG. 7 illustrates a direct pipe-to-pipe fitting 700 in accordance with one embodiment.

FIG. 7 depicts a direct pipe-to-pipe fitting 700 of the magnetic pipe square level as in one embodiment. This example displays two equivalent magnetic pipe square levels in two separate orientations, laterally inverted from each other, for application in a direct pipe-to-pipe fit. Accurate alignment of the secondary pipe 504 with the primary pipe 502 can be ensured with confirmation of the alignment of the left perpendicular member 702 with the right perpendicular member 704 for pipes of equivalent diameter, as well as visual inspection of the left bubble levels 706 and right bubble levels 708 for further leveling confirmation.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A magnetic pipe square level comprising:
   one or more magnetic members fused to an angle iron;
   a square that consists of a base member and a perpendicular member;
   said angle iron fused to said base member;
   one or more bubble levels attached to said square oriented in line with at least one of said base member and said perpendicular member;
   an anchor point attached to said perpendicular member;
   a track for a string line underneath tip of said angle iron;
   a notch at end of said track where said base member and said perpendicular member intersect; and
   one or more sets of tick marks along an edge of said perpendicular member providing a reference point for a measurement.

2. The magnetic pipe square level of claim 1 wherein said square contains a bubble level on said base member.

3. The magnetic pipe square level of claim 1 wherein said square contains a bubble level on said perpendicular member.

4. The magnetic pipe square level of claim 1 wherein said square contains a bubble level on said base member and said perpendicular member.

5. The magnetic pipe square level of claim 1 wherein two magnetic members are fused to ends of said angle iron.

6. The magnetic pipe square level of claim 1 wherein said measurement provides a length.

7. The magnetic pipe square level of claim 1 wherein said measurement provides an angle.

* * * * *